United States Patent [19]

Arai et al.

[11] 4,108,289

[45] Aug. 22, 1978

[54] HYDRAULIC COUPLING WITH A LOCK-UP CLUTCH

[75] Inventors: Hajime Arai, Aichi; Kiyoshi Ohnuma, Toyota, both of Japan

[73] Assignee: Toyota Jidosha Kogyo Kabushiki Kaisha, Toyota, Japan

[21] Appl. No.: 634,040

[22] Filed: Nov. 21, 1975

[30] Foreign Application Priority Data

Jul. 16, 1975 [JP] Japan .................................. 50/86918

[51] Int. Cl.² ............................................. F16H 45/02
[52] U.S. Cl. ...................................... 192/3.3; 192/86
[58] Field of Search ................ 192/3.29, 3.3, 86, 88 A

[56] References Cited

U.S. PATENT DOCUMENTS

| | | | |
|---|---|---|---|
| 2,623,411 | 12/1952 | Herndon | 192/3.3 X |
| 2,694,948 | 11/1954 | McFarland | 192/3.3 X |
| 2,726,557 | 12/1955 | Ackerman | 192/3.3 X |
| 3,185,273 | 5/1965 | Smirl | 192/3.3 |
| 3,338,358 | 8/1967 | Christenson et al. | 192/3.3 |
| 3,693,478 | 9/1972 | Malloy | 192/3.3 X |

*Primary Examiner*—Benjamin W. Wyche
*Attorney, Agent, or Firm*—Birch, Stewart, Kolasch & Birch

[57] ABSTRACT

A hydraulic transmission with a lock-up clutch comprising a housing which encloses a fluid transmission device like a torque converter and a mechanical lock-up clutch. The clutch includes a flexible disc which divides the chamber space confined by said housing into first and second chambers and may be selectively biased toward said first or second chamber due to a pressure difference generated between the two chambers. The flexible disc includes an opening through which a fluid circuit communicating through the first and second chambers in series is established to actuate, selectively either said torque converter or said lock-up clutch.

10 Claims, 2 Drawing Figures

HYDRAULIC COUPLING WITH A LOCK-UP CLUTCH

BACKGROUND OF THE INVENTION

1. Field of the Invention

The present invention relates to a transmission for automobiles and, more particularly, a hydraulic transmission equipped with a lock-up clutch.

2. Description of the Prior Art

The torque converter which is now widely used for a hydraulic transmission for automobiles comprises an impeller connected to an engine output shaft, a turbine connected to an input shaft of a gear transmission mechanism and a stator adapted to deflect the flow of fluid which returns from said turbine to said impeller in order to effect a determined torque conversion between the engine output shaft and the input shaft of the gear transmission mechanism according to a difference between the rotational speed of said output shaft and said input shaft while transmitting rotational power by means of fluid dynamics. In this torque converter, there exists inevitably a slippage between the impeller and the turbine even under the optimum operating condition where the rotational speed of the turbine has almost approached the rotational speed of the impeller, thereby lowering the power transmission efficiency when compared with the direct transmission mechanism by a mechanical clutch. This results in an increase in the fuel consumption of the automobile, which leads to problems regarding economy of petroleum and exhaust gas purification. In order to solve these problems, a hydraulic transmission system equipped with a lock-up clutch has been proposed. This system includes in parallel a hydraulic transmission, for example, a torque converter and a friction clutch, the latter being adapted to be selectively actuated for effecting direct transmission according to the operational condition of the automobile.

A typical structure of the hydraulic transmission with a lock-up clutch is disclosed in U.S. Pat. No. 3338358. This transmission comprises an input member, an output member, a housing mounted to said input member, said housing defining a cylindrical chamber at the front portion thereof and providing an impeller at the rear portion thereof. In addition, a turbine is received in said housing and connected to said output member. A flexible disc radially traverses said cylindrical chamber and engages in a fluid-tight and slidable manner an inner wall of said cylindrical chamber thereby dividing said cylindrical chamber into a front first chamber and a rear second chamber. An annular clutch element extends radially inwardly from said housing in said second chamber, and a clutch disc is in driving connection with said output member, a peripheral portion of said clutch disc being interposed between said flexible disc and said annular clutch element. The second chamber and the torque converter provided therein are supplied with fluid from a fluid supply passage which opens in a portion of said second chamber. The fluid is exhausted from a fluid exhaust passage which opens in another portion of said second chamber after having traversed the chamber space. Thus normal operation of the torque converter is maintained, especially the operating temperature thereof, in the same manner as the conventional torque converter-type hydraulic transmission. On the other hand, said first chamber is selectively supplied with hydraulic pressure through a fluid passage which opens in a portion of said first chamber. The supply of hydraulic pressure is controlled by a control valve referred to as a lock-up shift valve. The lock-up shift valve is operated to supply hydraulic pressure to said first chamber when said input and output members are to be directly mechanically connected in by-passing the torque converter. When the hydraulic pressure has been supplied to said first chamber, the pressure in said first chamber becomes higher than that in said second chamber, whereby said flexible disc is biased from said first chamber toward said second chamber thereby compressing the periperhal portion of said clutch disc between the peripheral portion of the flexible disc and said annular clutch element. Thus, said input and output shafts are directly mechanically connected through a power transmission route extending from said housing to said clutch disc by way of said annular clutch element. The fluid transmission including a lock-up clutch as disclosed in U.S. Pat. 3,338,358 is considered to operate satisfactorily in that the power is basically transmitted by the fluid transmission and is optionally transmitted by the lock-up clutch according to operational conditions. However, since this structure is adapted so that the torque converter is constantly circulated with fluid, as in the conventional torque converter transmission incorporating no lock-up clutch, it requires two fluid passages for supplying and exhausting fluid into and out of said second chamber in which the torque converter is mounted. Furthermore, in order to bias said flexible disc to effect engagement of the lock-up clutch by opposing the fluid pressure (torque converter pressure) existing in said second chamber, the fluid pressure to be supplied to said first chamber must be higher than said torque converter pressure, thus requiring a complicated design for an oil pressure system related with the transmission.

SUMMARY OF THE INVENTION

The object of the present invention is to provide an improved hydraulic transmission equipped with a lock-up clutch, particularly in view of an oil pressure system related therewith. This is an improvement over the prior system as disclosed in U.S. Pat. No. 3,338,358.

In order to accomplish the above mentioned object, the present invention proposes a transmission comprising an input member, an output member, a housing mounted to said input member, said housing defining a cylindrical chamber by a front portion thereof and providing an impeller by a rear portion thereof. A turbine is received in said housing and is connected to said output member, a flexible disc traverses radially within said cylindrical chamber and engages fluid-tightly and slidably with an inner wall of said cylindrical chamber thereby dividing said cylindrical chamber into a front first chamber and a rear second chamber. An, annular clutch element extends radially inwardly from said housing in said second chamber, a clutch disc is drivingly connected to said output member, a peripheral portion of said clutch disc being interposed between said flexible disc and said annular clutch element. A first fluid passage connected to said first chamber, a second fluid passage connected to said second chamber, and at least one opening which traverses said flexible disc to connect said first and second chambers, said opening having a throttling ratio which generates at least a predetermined pressure difference between said first and second chambers when fluid flows from said first chamber to said second chamber.

According to a modification of the present invention, said opening may incorporate a check valve which prevents fluid from flowing from said first chamber to said second chamber.

As a result of said opening which connects said first and second chambers by traversing said flexible disc, both the torque converter and the lock-up clutch are selectively operated by a single fluid circuit which passes in series between said first and second chambers. In other words, when the lock-up clutch is to be disengaged while effecting normal fluid transmission by the torque converter, fluid is supplied from the fluid passage connected to said second chamber and exhausted from the fluid passage connected to said first chamber. In this condition, the fluid which has traversed the torque converter flows through said opening to enter into said first chamber, whereby the fluid pressure in said first chamber is lower than that in said second chamber by an amount determined by the throttling ratio of said opening thereby generating a pressure difference between the two chambers. By the pressure difference, the flexible disc is positively biased from said second chamber toward said first chamber, thereby positively disengaging the clutch. Of course, the retraction of the flexible disc from its engaging position may be positively effected by the assistance of the spring force which is inherent in the flexible disc itself. By contrast, when the lock-up clutch is to be actuated, fluid is supplied from the fluid passage connected to said first chamber and is exhausted from the fluid passage connected to said second chamber. In this condition, the flow of fluid from said first chamber to said second chamber through said opening establishes a predetermined pressure difference between the two chambers based upon the throttling ratio of said opening when a check valve is incorporated in said opening, a determined pressure difference is positively established between the two chambers since flow of fluid from said first chamber to said second chamber is prevented. Therefore, the flexible disc is biased from said first chamber toward said second chamber and then it cooperates with said annular clutch element to press said clutch disc therebetween, thereby effecting frictional engagement between said clutch element and said clutch disc. Thus, a direct mechanical power transmission from said input shaft to said output shaft is established.

Therefore, according to the present invention, it is sufficient if the transmission is provided with only two fluid passages. Furthermore, the pressure of the fluid supplied through these passages may be a normal torque converter pressure for not only the torque converter operation but also for the lock-up clutch operation. The only requirement is that the direction of the flow is reversed, as in this case, the fluid pressure in the second or torque converter chamber is automatically exhausted when said first chamber is to be pressurized for actuating the lock-up clutch.

Thus, the present invention provides a very simplified fluid transmission equipped with a lock-up clutch which may be optionally switched over between fluid transmission by a torque converter to a mechanical transmission by a clutch whenever the direction of a fluid flow is reversed through a single fluid circuit.

An oil pressure control system, particularly adapted for use with the transmission with a lock-up clutch according to the present invention, for controlling the direction of fluid flow in the aforementioned single flow circuit is disclosed in copending application serial number 634,039 filed May 24, 1976 and assigned to the same applicant as the present application.

BRIEF DESCRIPTION OF THE DRAWING

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Other objects and further scope of applicability of the present invention will become apparent from the detailed description hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 1:
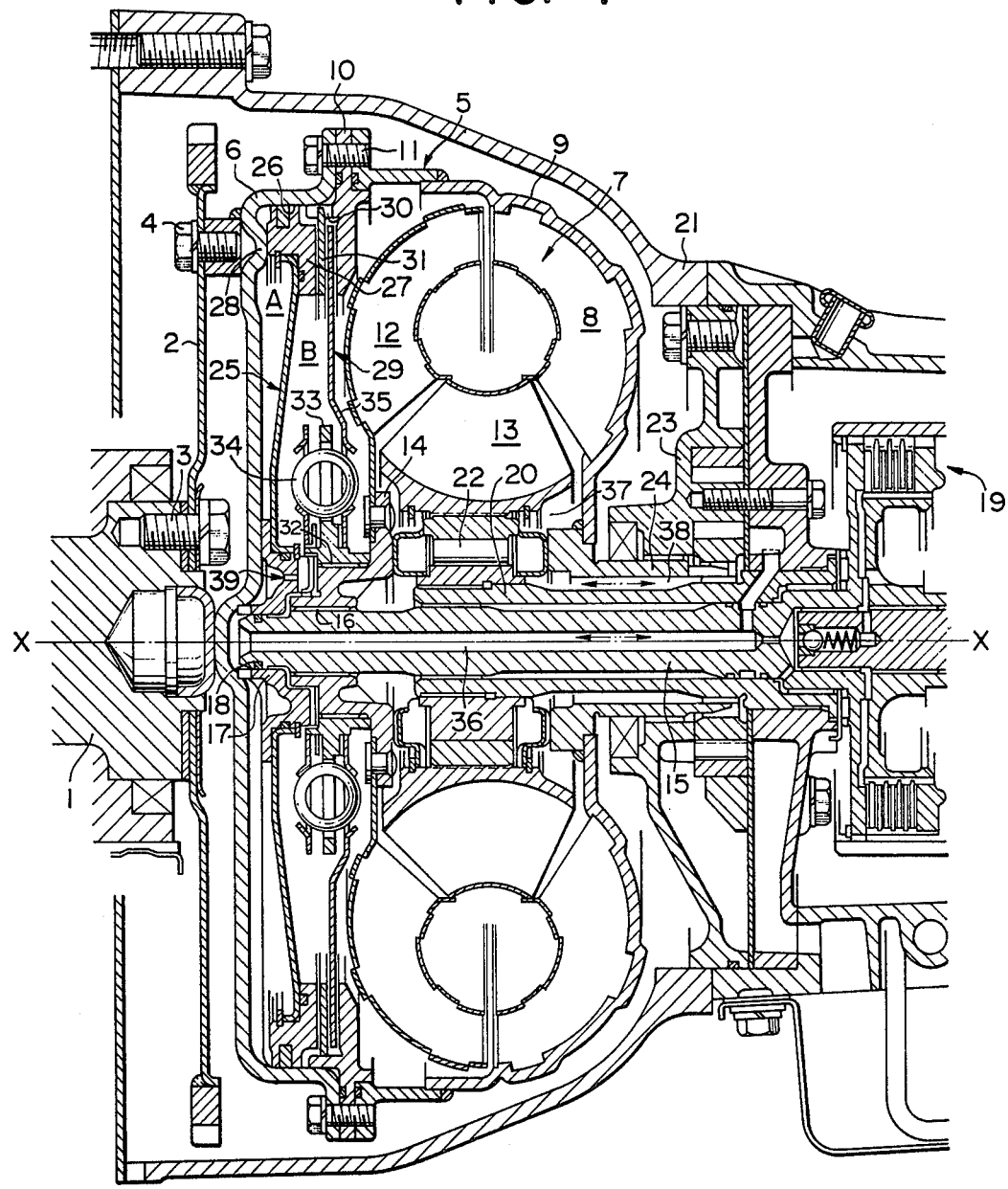
FIGS. 1 and 2 are sectional views showing two embodiments of the fluid transmission with a lock-up clutch according to the present invention.

Referring first to FIG. 1 which shows a first perferred embodiment of the present invention, 1 designates a rear portion of an engine output shaft, to which is mounted a fly wheel 2 by means of a plurality of bolts 3. The fly wheel 2 is connected with a housing generally designated by reference numeral 5 by means of a plurality of bolts 4 so that the engine output shaft 1, the fly wheel 2 and the housing 5 form a unitary structure which is rotatable around an axis X—X. The housing 5 encloses principal portions of the fluid transmission with a lock-up clutch and simultaneously constitutes a principal transmission element which is driven around said axis X-X by an input power supplied through its input member which is said engine output shaft 1. The housing 5 includes a front wall portion 6 connected with the fly wheel 2 by the bolts 4 and a rear pump housing portion 9 which forms an impeller 8 of a fluid torque converter generally designated by 7. At the connection of these two portions, an annular clutch element 10 is mounted to extend radially inwardly from an inner peripheral surface of said housing, these three members being clamped together by a plurality of bolts 11 arranged along the periphery of the housing. The torque converter 7 includes as usual a turbine 12 and a stator 13. The turbine 12 includes a turbine disc 14 which is mounted on an output shaft 15 extending along the axis X-X by means of a spline connection 16. The forward end portion (left end portion) of the output shaft 15 is engaged in a central opening of a flexible disc hub 17 mounted to said housing end wall portion 6. A tight fluid seal between the hub 17 and the output shaft 15 is achieved by use of a seal 18. The rear end portion (right end portion) of the output shaft is formed as an input shaft of a planetary gear transmission generally designated by 19. A sleeve 20 is provided around the output shaft 15, said sleeve being supported by an outside housing 21 which in turn is supported by the body of an automobile. Upon the sleeve 20, the stator 13 is supported by way of a one-way clutch 22. A rear end portion of the housing 5 which constitutes the impeller 8 is further connected with a hollow shaft 24 which serves as a drive shaft of an oil pump 23.

Adjacent the forward end wall portion 6 of the housing 5, a flexible disc 25 is provided and supported at its central portion by the aforementioned hub 17. The peripheral portion of the flexible disc 25 is formed by an annular piston element 27 which engages fluid tightly and slidably in a cylinder 26 provided by a cylindrical peripheral portion of the housing end wall portion 6. The annular piston element 27 is normally maintained at its retracted position shown in FIG. 1 by the spring force inherent in the flexible disc 25 until its forward end (left end) in the figure abuts against projections 28 formed in a part of the end wall portion 6. By the flexible disc 25, the space confined by the housing 5 is divided into chamber A positioned on one side (left side) of the flexible disc and chamber B located on the other side (right side) of the flexible disc.

Between the flexible disc 25 and the annular clutch element 10 which extends radially inwardly from the inner peripheral surface of the housing 5, a clutch disc generally designated by 29 is provided. The outer peripheral portion of the clutch disc 29 is opposed by the annular clutch element 10 and the annular piston element 27 by way of another annular element 31 which lutch disc 29 is opposed by the annular clutch element 10 and the annular piston element 27 by way of another annular element 31 which is supported by a guide portion 30 formed as a part of the annular clutch element 10 so as to be shiftable in axial direction while being held from rotation. The clutch disc 29 is made of a hub 33 mounted on said turbine disc 14 by means of a spline 32 and an annular plate member 35 elastically connected to said hub by means of a plurality of compression coil springs 34 extending in circumferential direction. This structure of the clutch disc incorporating the compression coil springs provides a buffering action for effecting smooth transmission of power from the input shaft 1 to the output shaft 15 through the clutch disc when the lock-up clutch is actuated.

The chamber A defined on the forward side of the flexible disc 25 communicates to a fluid passage 36 extending through a central portion of the output shaft 15 and, on the other hand, the chamber B defined on the rear side of the flexible disc communicates through an impeller inlet space 37 to an annular fluid passage 38 defined between the sleeve 20 and the pump shaft 24. The hub 17 for the flexible disc 25 is provided with an opening 39 having a predetermined throttling ratio.

Figure 2:
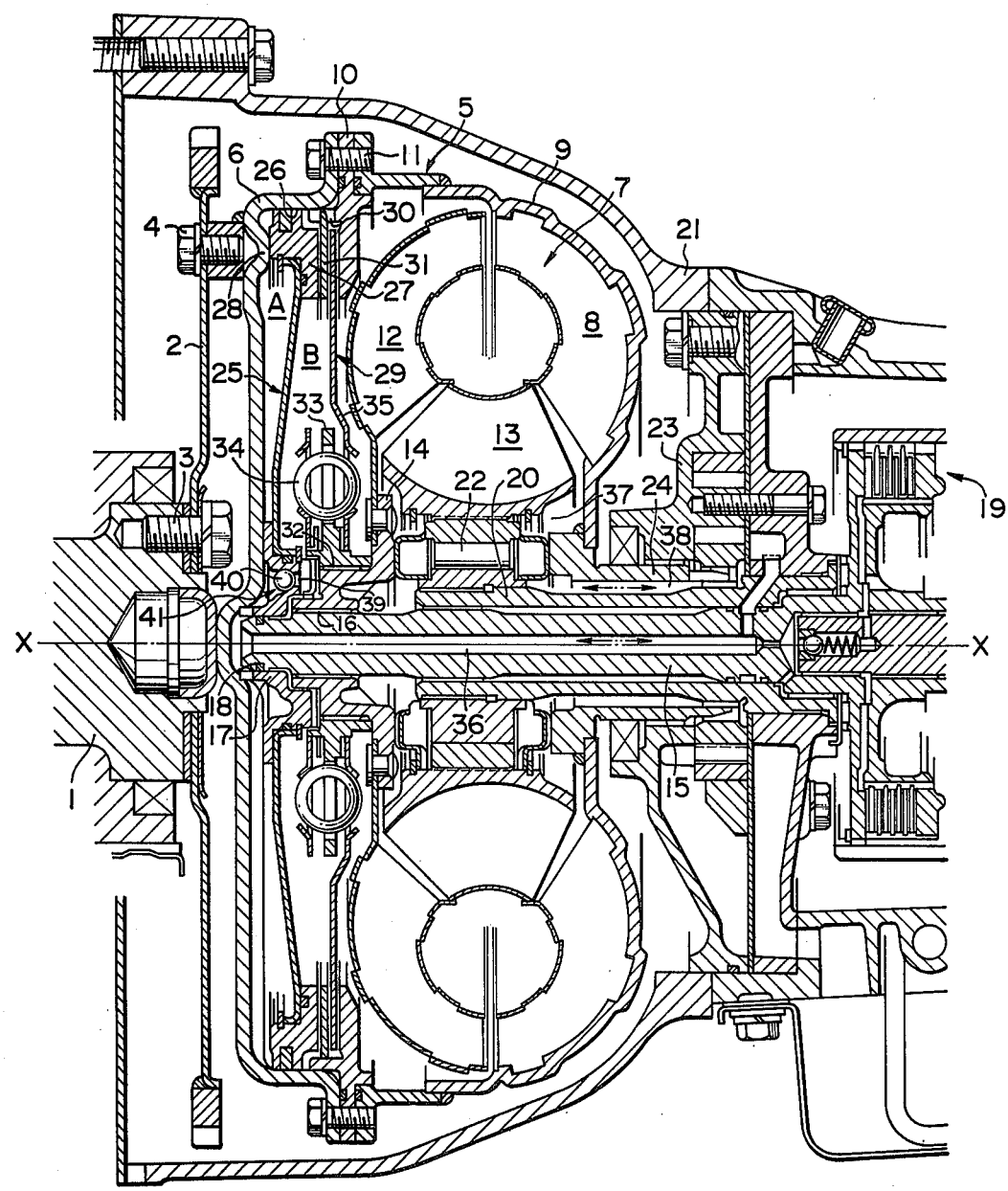

FIG. 2 is a view similar to FIG. 1 but showing another embodiment of the present invention. The structure shown in FIG. 2 is different from that shown in FIG. 1 only by a check valve 41 composed of a ball 40 incorporated in the opening 39 in the hub 17 for the flexible disc. The check valve 41 permits the fluid to flow from chamber B to chamber A but prevents the fluid from flowing from chamber A to chamber B.

When the transmission shown in FIG. 1 or 2 is to be operated to effect fluid transmission by the torque converter 7, fluid of a predetermined pressure is supplied from the fluid passage 38 by an oil pressure control system such as disclosed in the aforementioned application Ser. No. 634,040 The fluid is then supplied through the impeller inlet space 37 into an annular passage connecting the impeller 8, the turbine 12 and the stator 13. Thereafter, the fluid gradually traverses the chamber B toward the opening 39 and, after having passed through the opening, the fluid is exhausted through the fluid passage 36. Even when the check valve 41 is incorporated in the opening 39 as in the embodiment shown in FIG. 2, the flow of fluid from chamber B to chamber A is effected just in the same manner as in the embodiment shown in FIG. 1. Thus, a predetermined amount of fluid flow through the torque converter is maintained as long as the fluid transmission by the torque converter is effected, thereby ensuring the normal operation of the torque converter. Under this condition, since the fluid flows from chamber B to chamber A through the opening 39 having a throttling effect, the fluid pressure in chamber A is lower than that in chamber B by an amount determined by the throttling ratio of the opening 39, whereby the flexible disc 25 is maintained at its retracted position shown in the figures where its front end portion abuts against the projections 28 formed in the housing end wall portion 6 due to the aforementioned pressure difference and the spring force inherent in the flexible disc itself, thus allowing for free rotation of the outer peripheral portion of the clutch disc 29 along the annular clutch element 10. In this condition, no power is transmitted directly from the housing 5 to the output shaft 15 by way of the clutch disc 29.

By contrast, in the operating condition where it is favorable to transmit power directly from the input shaft 1 to the output shaft 15 in by-passing the torque converter for the purpose of avoiding power loss due to slippage in the torque converter, the fluid is circulated through the transmission in the direction to be supplied from the fluid passage 36 and exhausted from the fluid passage 38 by an oil pressure control system such as disclosed in the aforementioned application Ser. No. 634,040 In this condition, the fluid flows into the chamber A through the passage 36 and then, in the embodiment shown in FIG. 1, it further flows into the chamber B through the opening 39 and, after having traversed the chamber B including the torque converter 7, the fluid is exhausted through the fluid passage 38. In this case, since the fluid flows from chamber A to chamber B through the opening 39 having a throttling effect, the fluid pressure in chamber B is lower than that in chamber A by an amount determined by the throttling ratio of the opening 39. In the embodiment shown in FIG. 2, since the fluid flow from chamber A to chamber B is prevented by the check valve 41, the fluid pressure in chamber B is, of course, lower than that in chamber A. Due to the pressure difference between chambers A and B, the flexible disc 25 is biased from chamber A toward chamber B against its inherent spring force so that the annular piston element 27 at its outer peripheral portion presses the outer peripheral portion of the clutch disc 29 against the annular clutch element 10 by way of the annular element 31 at a predetermined pressure. By this pressure, a frictional engagement is established between the annular clutch element 10 and the clutch disc 29 thereby effecting direct transmission of power through the input shaft 1, the housing 5, the annular clutch element 10, the clutch disc 29 and the output shaft 15. In the abovementioned manner, the fluid transmission with a lock-up clutch according to the present invention can be optionally operated in the manner of fluid transmission by a torque converter or mechanical transmission by a clutch by selectively supplying fluid from either the fluid passage 38 or 36 while exhausting same from either the passage 36 or 38.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A transmission comprising:
   an input member;
   an output member;
   a housing mounted to said input member, said housing defining a cylindrical chamber by a front portion thereof and providing an impeller by a rear portion thereof;
   a turbine received in said housing and connected to said output member;
   a flexible disc which traverses radially said cylindrical chamber and engages fluid tightly, slidably with an inner wall of said cylindrical chamber thereby dividing said cylindrical chamber into a front first chamber and a rear second chamber;
   an annular clutch element which includes a portion projecting radially inwardly from said housing, a radially outwardly projecting flange portion affixed to said housing and an integral intermediate portion;
   a clutch disc drivingly connected to said output member and axially displaced from said flexible disc;
   said intermediate portion of said annular clutch element extending axially forward over the clutch disc and includes a spline means thereon;
   an annular element positioned within said spline means preventing relative rotation and permitting axial movement;
   said flexible disc and said annular element being forward of said clutch disc and said portion of said annular clutch element which projects radially inwardly being rearwardly of said clutch disc;
   a first fluid passage connected to said first chamber, a second fluid passage connected to said second chamber and at least one opening which traverses said flexible disc to connect said first and second chambers;
   said opening having a throttling ratio which generates a predetermined pressure difference between said first and second chambers when fluid flows from said first chamber to said second chamber, whereby as the fluid pressure in the first fluid chamber is increased, the fluid pressure in the second fluid chamber is relieved and the opening between the first and second chambers permits a gradual, throttled change in the fluid pressures.

2. The transmission of claim 1, wherein said flexible disc is supported by a hub member and said opening is formed in said hub member.

3. The transmission of claim 2, wherein said hub member has a central opening which fluid-tightly receives an end portion of said output shaft, said first fluid passage being formed through said output shaft to open at said end portion received by said hub member.

4. The transmission of claim 1, wherein said flexible disc is preformed to elastically set itself at its retracted position where it does not engage said clutch disc.

5. The transmission of claim, wherein said clutch disc is an annular plate element mounted to a hub of said turbine, said turbine hub being drivingly mounted to said output member, said annular plate element being formed with an opening in which a compression coil spring supported by said hub engages thereby effecting a buffering connection between said hub and said annular plate element as well as providing a through opening which allows for traversing of fluid therethrough.

6. The transmission of claim 1, wherein said second fluid passage is defined by a hollow shaft which is driven by said housing to drive an oil pump incorporated in the transmission and a sleeve member which supports a stator adapted to cooperate with said impeller and said turbine.

7. The transmission of claim 6, wherein said second fluid passage opens in an annular space located adjacent an interface between said stator and said impeller.

8. A transmission of claim 1, wherein as the fluid pressure in the second fluid chamber is increased, the fluid pressure in the first fluid chamber is relieved and the opening between the first and second chambers permits a gradual, throttled change in the fluid pressures.

9. A transmission comprising:
   an input member;
   an output member;
   a housing mounted to said input member, said housing defining a cylindrical chamber by a front portion thereof and providing an impeller by a rear portion thereof;
   a turbine received in said housing and connected to said output member;
   a flexible disc which traverses radially said cylindrical chamber and engages fluid tightly, slidably with an inner wall of said cylindrical chamber thereby dividing said cylindrical chamber into a front first chamber and a rear second chamber;
   an annular clutch element which includes a portion projecting radially inwardly from said housing, a radially outwardly projecting flange portion affixed to said housing and an integral intermediate portion;
   a clutch disc drivingly connected to said output member and axially displaced from said flexible disc;
   said intermediate portion of said annular clutch element extending axially forward over the clutch disc and includes a spline means thereon;
   an annular element positioned within said spline means preventing relative rotation and permitting axial movement;
   said flexible disc and said annular element being forward of said clutch disc and said portion of said annular clutch element which projects radially inwardly being rearwardly of said clutch disc;
   a first fluid passage connected to said first chamber, a second fluid passage connected to said second chamber and at least one opening which traverses said flexible disc to connect said first and second chambers;
   said opening having a throttling ratio which generates a predetermined pressure difference between said first and second chambers when fluid flows from said second chamber to said first chamber and said opening incorporates a check valve which prevents fluid from flowing from said first chamber to said second chamber.

10. The transmission of claim 9, wherein said check valve is a ball check valve having a ball mounted in said opening.